Figure 1:
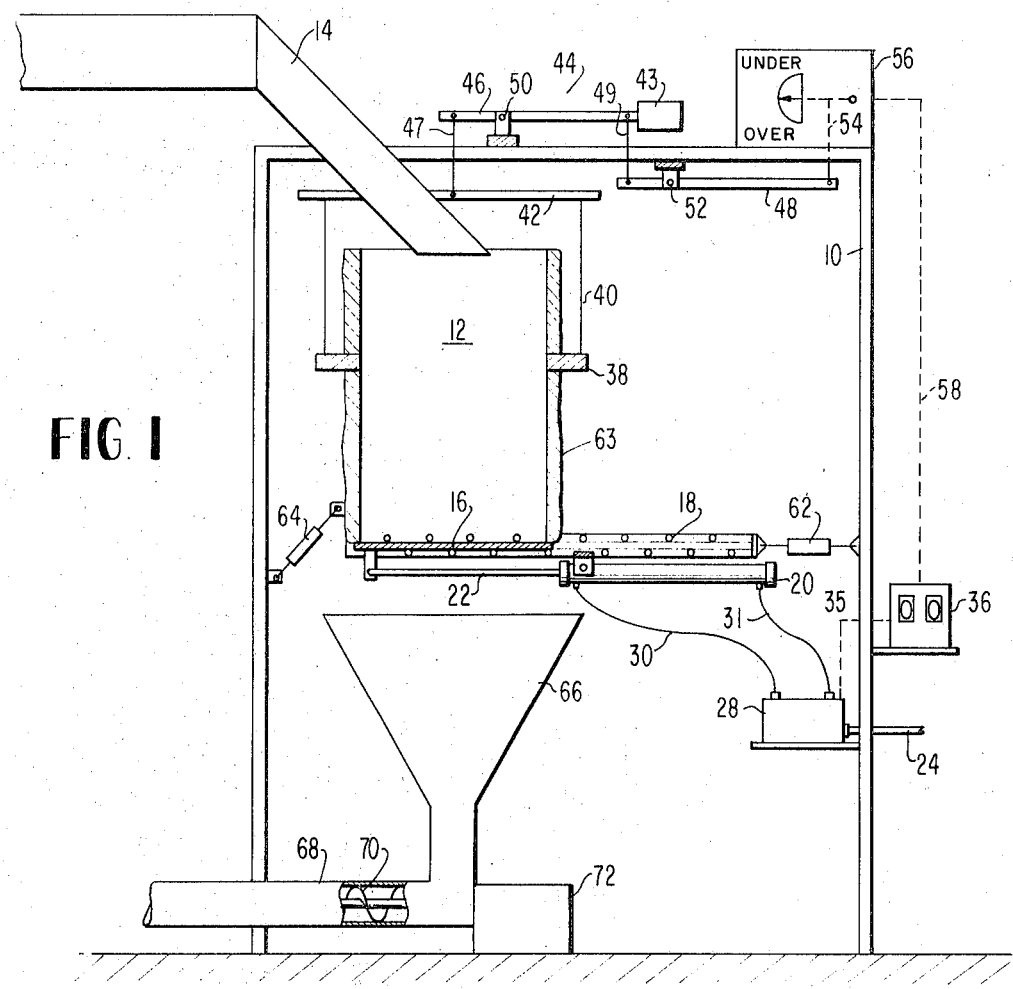

United States Patent [19]
Delesdernier

[11] 3,853,190
[45] Dec. 10, 1974

[54] APPARATUS FOR WEIGHING DRAUGHTS OF BULK MATERIAL

[76] Inventor: Mark Delesdernier, 3624 Clifford Dr., Metairie, La. 70002

[22] Filed: May 4, 1973

[21] Appl. No.: 357,180

[52] U.S. Cl.................. 177/105, 177/108, 177/184
[51] Int. Cl............................................ G01g 13/18
[58] Field of Search.......................... 177/59, 74–78, 177/80, 89, 105–113, DIG. 7, 46–48, 164–165, 184–189

[56] References Cited
UNITED STATES PATENTS

| | | | |
|---|---|---|---|
| 3,045,770 | 7/1962 | Haver | 177/110 X |
| 3,124,206 | 3/1964 | Burke | 177/165 X |
| 3,133,607 | 5/1964 | Gardner et al. | 177/108 |
| 3,168,926 | 2/1965 | Dietert | 177/116 X |
| 3,193,029 | 7/1965 | Harvison et al. | 177/189 X |
| 3,263,760 | 8/1966 | Waller | 177/184 X |
| 3,474,874 | 10/1969 | Pettis, Jr. | 177/164 X |
| 3,486,573 | 12/1969 | Cerman et al. | 177/74 |
| 3,522,853 | 8/1970 | Fluur et al. | 177/1 |
| 3,608,656 | 9/1971 | Pettis | 177/108 X |
| 3,707,172 | 12/1972 | Obara | 177/118 X |

Primary Examiner—Stephen J. Tomsky
Assistant Examiner—Vit W. Miska
Attorney, Agent, or Firm—Morton, Bernard, Brown, Roberts and Sutherland

[57] ABSTRACT

A weighing apparatus that is particularly advantageous for weighing draughts of bulk particulate material utilizes a rapidly, horizontally reciprocating lower gate on a hopper which is actuated when the accumulated load in the hopper reaches the desired weight. The lower gate is opened for at least a sufficient time to permit the load to be delivered. The feed to the hopper need not be terminated during the delivery, and it is desirable to employ continuous feed in order to avoid time lags in starting and stopping the feed supply which may increase the time required for delivery of each draught.

4 Claims, 2 Drawing Figures

PATENTED DEC 10 1974   3,853,190

AN APPARATUS FOR WEIGHING DRAUGHTS OF BULK MATERIAL

This invention relates to improvements in weighing apparatus and more particularly to an automatic batch weighing apparatus which can weigh successive draughts of bulk particulate materials such as ice, grains, dry chemicals, cement, concrete mixes and the like at a substantially faster rate and with greater accuracy in the weight of the material supplied than was heretofore possible.

Typically, weighing apparatus of the type to which the present invention relates comprise a pivoted weigh beam which supports a weigh hopper and a counterweight on opposite sides of the beam fulcrum. Material to be weighed is fed to the hopper and when the load accumulated in the hopper approaches a weight that balances the counterweight, the feed supply is terminated or interrupted by a catch gate or other suitable means while the weighed load is delivered. The bottom open end of a weigh hopper in this type of weighing apparatus is frequently maintained closed by means of a pair of oppositely acting hopper gates of clam-shell construction or by means of two downward slanting panels adapted so as to latch together in a trough-like arrangement, wherein one of the panels remains fixed in a slanted position, whereas the other panel is hinged along the side of the weigh hopper and swings down when it is desired to empty the ice from the hopper and swings upwardly to be closed.

Weighing apparatus of the type described above have not met with complete success in weighing particulate material. Principal drawbacks of such weighing apparatus is that their operation is slow and/or the apparatus is easily upset from adjustment and does not supply an accurate weight of particulate material. A major reason for the slowness of the weighing operation in the weighing apparatus is the fact that the feed supply to the scale is terminated after each batch is delivered to the weigh hopper to allow the accumulated load to be released. Time is required to initiate and provide the rate of the feed of particulate material to the apparatus for a subsequent draught, and often the feed system is complex requiring complex instrumentation to coordinate start-up and shut-down of the system as well as requiring excessive wear on motors or clutches in such cycling. When a trough-like closure means is used on the hopper, the material within the weigh hopper is not free to drop uninhibited but rather is obstructed by the fixed panel and is funnelled through the opening. The trough-like hopper gate slows down the operation of the weighing apparatus due to the length of time necessary to open and shut the gate since the gate must travel by swinging. Furthermore, since in this type hopper gate a latch must be engaged to hold it closed, for instance, when ice is weighed, the latch has a tendency to wear excessively and require relatively frequent replacement. Moreover, particulate material may clog the latching mechanism. The swinging gate is usually released by the weight of the material in the hopper and is closed by use of a counter weight. The speed of closing of the gate is relatively uncontrolled and frequently impacts with the hopper for latching with sufficient force to disturb the calibration of the scale.

Whenever a pair of oppositely acting hopper gates is used, the complexity of the actuating mechanism is increased. For instance, it is necessary to coordinate the gates as they are being opened so that the material is free to drop uninhibited from the hopper, and as they are being closed, so that no material is trapped between the gates or in the gate support means. The gates must also be coordinated so that they form a tight juncture when in a closed position so that no material being weighed drops from the hopper prematurely and thus affects the accuracy of weight of the draught to be delivered.

The supply of material to the hopper is generally terminated during delivery of the material in the hopper. Termination of the feed may be by stopping the supply means or by employing a holding hopper which can be actuated to an open position when the weighing bin is ready to receive the next draught. Not only does the use of a holding hopper entail additional capital expense and require more complex instrumentation, but also when the initial bulk or main weight of material is released from the holding hopper into the weigh hopper, particularly when large draughts are weighed, e.g., about 100 pounds or more, the weighing apparatus is often subjected to shock and unnecessary strain resulting in possible damage to the weighing apparatus or adverse effect on the calibration of the weighing apparatus such that the desired accuracy in the weighing operation is lost. The opening and closing of the oppositely acting clam-shell hopper gates, which operate by opening upwardly and outwardly, can, likewise, shock and unnecessarily strain the weighing apparatus due to the vertical movement and hence affect the accuracy of the actual weighing system.

Since such prior apparatus may frequently be rendered inaccurate after several loads are weighed, material above that sufficient to provide the requested weight has been supplied in order to avoid the possibility of penalties being imposed by federal, state, or local governments due to delivery of an underweight load and time consuming recalibration of the weighing apparatus must be effected at relatively frequent intervals, to minimize loss in delivery of overweight draughts. The operator not only loses use of weighing apparatus during recalibration, but also may be required to increase his manpower to conduct the recalibration. Thus, a distributor or operator employing such weighing apparatus will suffer an economic loss. Moreover, when overweight quantities are delivered to vehicles using federal and state highway systems, large vehicles may become overweight and subject to sanction by the authorities.

This invention relates to a batch weighing apparatus which is particularly advantageous for weighing successive draughts of bulk particulate material such as ice, grains, dry chemicals, cement, concrete mixes and the like at a substantially faster rate and with greater accuracy in the weight of the material supplied than was heretofore possible. The weighing apparatus of this invention may not be subject to the vertical and horizontal forces which are often experienced in prior apparatus and which tend to upset the calibration of the apparatus. The weighing operation employing the apparatus of this invention is relatively rapid and may easily be adapted to continuous or semi-continuous operation and may be operated manually or automatically. The weighing apparatus may be of simple construction and may be designed with minimal obstruction to the passage of the material being weighed. Furthermore, the apparatus of this invention may be used with a continuous feed supply and avoid the necessity of terminating the feed to the hopper during delivery of the draught, thus avoiding loss of time in start-up and shut-down of the feed supply means or the use of a holding hopper.

An advantageous use of the weighing apparatus of this invention is in weighing particulate ice. Particulate ice, for instance, is frequently used as the refrigerant medium in holds of fishing vessels, and often, the ice requirements for a vessel are about 2 to 4 tons. The ice must be quickly delivered from the point of manufacture to the holds of the vessel to prevent melting and refreezing in order that the fishermen receive ice without unduly large amounts of liquid water, in particulate form such that handling of the ice once in the hold is facilitated. Moreover, since the ice is to be used in association with a food product, it is necessary that the ice remain relatively uncontaminated from the ice plant to the hold of the vessel. Since ice is sold by weight, a weighing apparatus must be employed, however, weighing the entire amount of ice to be delivered to a vessel would require an excessively large apparatus and require excessively long residence times for a major portion of the ice while the accumulation of ice in the hopper is brought up to the desired weight. Thus, it has been the practice to weigh and deliver successive draughts of ice to the hold of the vessel. Normally, these draughts are about 300 to 400, preferably 300, pounds each. Heretofore, when the ice was supplied to the hopper, the supply means was stopped or fed the ice into a holding hopper while the ice in the weighing hopper was delivered to the hold of the vessel. Starting the supply means, for instance, a screw conveyor or pneumatic conveyor, required considerable power, and since the feeding supply means had to start and stop, a greater amount of time was required than is desirable for the delivery of each draught. If a holding hopper is employed to terminate the supply of ice, the initial charge to the weighing hopper may jar the weighing apparatus sufficiently to upset the calibration. The apparatus of this invention permits the weighing of successive draughts of particulate ice without the necessity of shutting down the supply means or using a holding hopper.

In the weighing apparatus of this invention, the weighing hopper has a gate which reciprocates in an essentially horizontal direction and which, when actuated, is opened and closed in a predetermined interval. Desirably, the gate opens rapidly in order that the particulate material is allowed to leave the hopper quickly. The gate remains in the open position until substantially all of the weighed material has exited the hopper and then the gate is closed. Especially when the supply of particulate material to the hopper is continued during the delivery, the activating means for the gate should be adjusted such that the gate remains open for a period of time at least sufficient to permit delivery of the desired weight of material but not significantly longer. The closing of the gate should be sufficiently rapid such that only a minimal amount of the incoming material will pass through the hopper. By employing an essentially horizontal movement of the gate, vertical movement which may upset the calibration of the apparatus is avoided. As the gate closes, a vertical surface is provided which collects the particulate material, which is continually being fed to the hopper, and thus abates loss of particulate material through the bottom of the hopper.

Preferably, a dampening means is provided between the hopper and a fixed structural member such as the frame in order to provide a dampening effect in a direction parallel to the movement of the gate. The dampening means serves to minimize oscillations that might be produced by the rapid movement of the gate. The dampening means should be pivotally mounted such that it does not adversely affect the weighing action of the apparatus. The horizontal dampening means may, for example, be a shock absorber, for instance, a fluid-type shock absorber, or a member providing limited horizontal movement but relatively unlimited vertical movement such that any natural oscillations of the hopper are deteriorated.

The gate may be moved by any suitable actuating means. For instance, the gate may be connected to a drive arm which is powered by a mechanically rotated cam, wherein the relative period of time the gate is open to that which the gate is opening or closing may be primarily dependent upon the configuration of the cam, and the speed of the cycle is primarily dependent upon the speed of rotation of the cam. Alternatively, the drive arm may be powered by an electromagnet where the timing of the gate movement may be predetermined and controlled by an electric timing means, or preferably, the drive arm is powered by a fluid operated piston and cylinder. The timing of the piston and cylinder may be fluid actuated, particularly when pneumatic, or it may be electrically actuated using solenoid valves.

The drive arm is preferably affixed to the bottom of the gate in a pivotable manner in order that the arm can rotate in the plane perpendicular to the plane of movement of the gate. Frequently, the weight of the material being weighed in the hopper causes the gate to bulge convex downwardly, the ability to the drive arm to pivot alleviates any stress that would occur if the arm were rigidly affixed to the gate. The drive arm may travel at an angle to the direction of travel of the gate, hence the pivotal movement permits the angle of the drive arm to the gate to vary as the drive arm is drawn inwardly or outwardly. It is desirable that the drive arm be mounted on the gate such that during the opening of the gate, at the pivot point of the arm and gate, a pulling rather than pushing effect is achieved to enhance mechanical advantage. The drive arm is desirably positioned so that it extends away from the gate in the direction of opening the gate such that when the gate is in the open position, the drive arm is not in the path of the material being released from the hopper.

The power means to which the drive arm is connected and which motivates the drive arm may be attached to the hopper, or it may be attached to the frame or other stationary member. Preferably, the power means is attached to the hopper to avoid any interference with the weighing action of the apparatus. The power means should be permitted to pivot in the same manner as the drive arm and gate to prevent undue stresses and strains and to abate any adverse effect upon the weighing action of the apparatus, or the drive arm may be hinged to permit pivoting. When the power means is attached to the frame of other stationary member, it is necessary to mount the power means such that vertical movement of the hopper is not hindered.

The power means may be activated by any convenient means. Often the nature of the power means will dictate the most practical means of activation as disclosed above. An advantageous power means is a piston and cylinder apparatus wherein the piston is motivated by fluid, preferably air or other gas. The travel of the piston should be sufficient to provide for complete opening and closing of the gate. Suitable levers or other gearing mechanism may be employed to amplify, or reduce, the travel of the piston required for complete opening of the gate. The piston and cylinder may preferably be double actuated in order that the piston can be positively forced in either the inward or outward direction. The power means can be activated manually or by the weighing apparatus upon achieving the desired load weight. An advantageous type of piston and cylinder system is the cushion-type pistons such as are made by the Parker Hannifin Company, wherein when the piston nears the end of its stroke, the piston and cylinder form a closed chamber in which air is compressed due to movement of the piston to cushion the impact of the piston at the end of its stroke.

Preferably, the cycling of the gate on the hopper to the open, then closed position is in accordance with predetermined intervals of time. In general, it is desirable to maintain the cycle of the shortest period of time which is sufficient to permit essentially complete delivery of the accumulated material in the hopper. Factors which are to be considered are the behavior of the particulate material while being released, the effect of the sides and lower portion of the hopper on the time period required to release essentially the entire accumulated material in the hopper, and the like. It is advantageous to have the gate rapidly open and close in order to provide the maximum area of opening for a substantial duration of the delivery cycle. Calibration of a timer or other device or system to activate the power means may be done empirically by accumulating the desired amount of material in the hopper and varying the gate timing to provide a desired result. For example, when ice is the particulate material being weighed, and the hopper has vertical sides and a 3 to 4 square feet opening, a three hundred pound draught can be delivered in about 0.6 to 0.9 or 1.5 second including about 0.1 to 0.3 second to open and to close the gate. When employing the apparatus of this invention to weigh ice, the cycle may be adjusted depending upon the temperature or age of ice. For instance, freshly made particulate ice can usually be delivered more rapidly from the storage hopper than ice which has been in storage for considerable periods of time, e.g., about one month or more, and has excessive snow associated therewith.

The weighing apparatus may, in other respects, be of conventional design, and have a frame and a weigh beam supported from the frame which in turn supports the hopper. The weigh beam may be connected to a conventional "over and under" type device to amplify movement of the weigh beam at the desired balance point. The weigh beam or "over and under" type device may be designed to trip a switch, e.g., microswitch or reed switch, which in turn activates the gate mechanism to release the weighed draught. See, for instance, U.S. Pat. No. 2,705,607. In this manner the weigh apparatus may be operated essentially automatically by using a conventional counter mechanism to count the number of cycles of the gate and to terminate the action of the gate at a predetermined number of draughts. Advantageously, a manual over ride is provided to terminate the delivery of draughts prior to the preselected number or to add additional draughts to the preselected number.

Generally, in operation the apparatus of the present invention is not subjected to vertical shocks due to the design of the hopper gate and due to the use of continuous feed supply in an embodiment of the invention. It may, however, under certain circumstances, e.g., when the feed stream is intermittent or exceptionally large particles are being fed to the hopper, be desirable to provide dampening means which operate in a vertical direction to deteriorate any vertical oscillations which may exist. Suitable dampening means include shock absorbers and the like. The dampening means should not adversely affect the operation of the weighing apparatus. When an "over and under" type device is employed, a dampening means linking the weigh beam with the "over and under" type device or connected to the indicator or switch-tripping member of the device, to counteract small vibrations that may travel from the hopper through the weigh beam. Thus, the weighing apparatus of this invention may be used without lag time between delivery of the draught and supplying material for a successive draught which would otherwise be required to permit the scale to come to rest for an accurate reading. Moreover, shocks which tend to upset calibration of the weigh apparatus are abated, and hence, the delivery of the material can be to an accurate weight without frequent recalibration of the weighing apparatus. The use of vertically-oriented dampening means is more frequent when a light weight hopper is used since the lesser mass of the hopper will permit more substantial vibrations.

Figure 2:
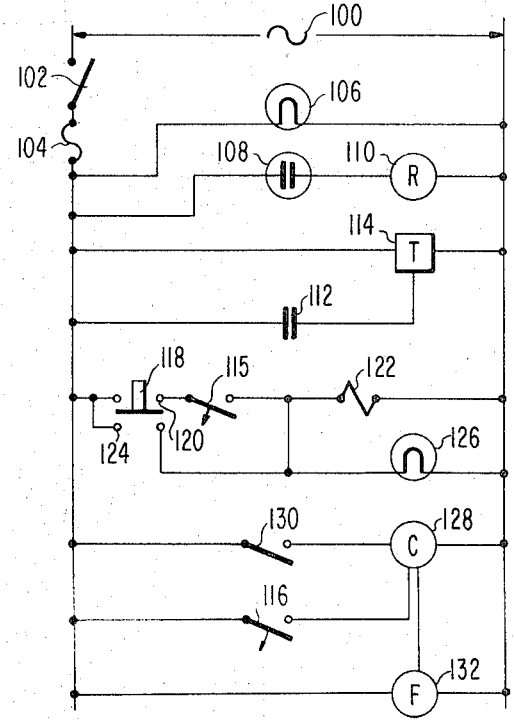

For a more complete understanding of the present invention, reference should be made to the following detailed specification and accompanying drawings in which:

FIG. 1 is a partially diagrammatic view illustrating an automatic batch weighing apparatus constructed according to one embodiment of the present invention; and FIG. 2 is a schematic representation of an automatic control mechanism for use with the present invention to provide a plurality of draughts in rapid succession.

With reference to FIG. 1, the frame supporting the weighing apparatus is generally indicated as 10. Although frame 10 is depicted as partially broken away, any conventional frame design, such as that disclosed in U.S. Pat. No. 2,705,607 can be used. The weighing apparatus comprises a weigh hopper 12 which is disposed below the discharge end of the feeding chute 14 so as to receive the material falling therefrom by gravity. The weigh hopper, as shown, is of substantially straight-sided and open-ended construction, and its bottom open end is normally maintained closed by means of a horizontally reciprocating hopper gate 16 which is adapted to be actuated to its open position at a fast rate, thus to dump contents of the weigh hopper. Gate 16 is moved horizontally through rollers 18 by means of drive arm 22 which is powered by a piston and cylinder arrangement, indicated by 20, which is shown as being pivotally mounted on a mounting bracket provided by the structure of hopper 12.

Although it is not essential that piston and cylinder arrangement 20 be pivoted, it is preferable since there may be shear stresses applied to the piston and cylinder arrangement due to slight downward bending of the gate when a large load is contained therein. Moreover, the piston and cylinder can be mounted at an angle to the movement of the gate, the pivoting movement is necessary to accommodate the change in angle between the gate and drive arm during movement of the gate. Line 24 supplies fluid pressure, such as pneumatic or hydraulic pressure, to control valve 28, which controls the direction of flow of the fluid through line 30 or 31 to piston and cylinder arrangement 20. Control valve 28 can be any conventional type control valve such as Hannifin Series SS2000 solenoid valves with Series SP port speed controls manufactured and sold by Parker Hannifin Corporation. The control valve is actuated by electrical impulse via line 35 from electrical control source indicated generally by 36. The electrical control source may be activated manually or automatically by the scale.

The scale mechanism comprises hopper 12 which has flange 38 around its girth having vertical support rods 40 attached thereto to support the hopper from scale platform 42. The weigh beam mechanism comprises arms 46 and 48 which are pivotally supported by frame 10 at points 50 and 52. Arm 46 is connected to scale platform 42 via line 47 at one end, and the other end is provided with counterbalance 43 and is attached via line 49 to arm 48. The other end of arm 48 is connected via line 54 to under and over indicator 56. The over and under indicator is adapted to provide a signal via line 58 to electrical control source 36.

Shock absorbing device 62 is provided between frame 10 and hopper 12 and has its effective force component parallel to the direction of the reciprocating movement of gate 16. Although shock absorbing device 62 is shown as being in a horizontal position, it is only necessary that it have a force component parallel to the movement of the hopper gate which is sufficient to absorb any shock and unnecessary strain caused by such movement. Weigh hopper 12 is depicted as being covered with a layer of insulating material 63 since the weighing apparatus of the present invention in a preferred embodiment can be used to weigh materials such as ice, and a low temperature must be maintained during the weighing operation. Any conventional insulation materials or coatings having insulating properties can be used with this invention. Although material 63 is depicted as being located on the outside of hopper 12, the weighing apparatus of this invention may be adapted such that the insulating material covers the inside surfaces of the hopper. If the insulating material or coating is located on the inside surfaces of the weigh hopper it is beneficial that the surface of this material is essentially non-porous so that removal of the particulate bulk material being weighed is not inhibited.

Shock absorbing device 64 is shown as attached to hopper 12 and from 10 and has an effective force component parallel to the direction in which the material to be weighed drops from the discharge end of feed chute 14. Although shock absorbing device 64 is shown as being in an essentially vertical position, it is only necessary that it has a vertical shock absorbing component to counter unwanted oscillations in the operation of the weighing apparatus.

Collector 66 is provided below gate 16 to receive the draught released from hopper 12. The collector is in communication with screw feeder 68 which serves to remove the material from collector 66 and deliver it to, for instance, a hold of a vessel. A partial breakaway of the screw feeder illustrates screw conveyor 70 which is powered by motor 72.

FIG. 2 assists in the understanding of the control mechanism of an apparatus such as depicted in FIG. 1. A suitable alternating voltage supply 100 is provided for the operation of the electrical control system. Switch 102 is the main power switch for the control system. Fuse 104 is provided to prevent electrical overloads which may damage electrical components in the system. When switch 102 is closed, pilot light 106 is lit to indicate that the control system is in operation. Microswitch 108 is potentiated by supply of current. The microswitch is located in the over and under indicator 56 and is actuated when the weigh arm mechanism reaches its balance point as registered on the over and under indicator. The microswitch is in communication with relay 110. Relay 110 has contacts 112 which when closed, actuate timer 114. The timer serves to automatically control the cycle for opening and closing of gate 16. As depicted, the timer has contacts 115 and 116. When selector switch 118 is in the automatic mode, i.e., bridging contacts 120, timer contact 115 is potentiated. When the timer is actuated by relay 110, contact 115 is closed permitting a signal to activate solenoid 122 which in turn operates a valve in control valve 28 to send fluid pressure via line 30 to piston and cylinder arrangement 20. The timer maintains the solenoid actuated for the desired period of time to permit discharge of the material in hopper 12, and then opens timer contact 115 which reverses the action of the solenoid and control valve 28 diverts the fluid pressure via line 31 to close the gate. The gate may be opened and closed by manual control by placing selector switch 118 in the manual mode, i.e., bridging contacts 124. Pilot light 126 is in communication with solenoid 122 and is lit when the solenoid is actuated by the closing of timer contacts 115 or when the selector switch is in the manual mode.

Timer 114 also serves to close timer contact 116 when a signal is received from microswitch 108. When timer control 116 is closed a signal is transmitted to counter 128. Counter 128 provides several functions. In one aspect, upon receiving a signal resulting from closing timer contact 116, it registers a delivery for the benefit of the weigher and the consumer. In another aspect, it may serve to control the feed supply system such that when a desired number of draughts have been delivered, the feed supply system is automatically shut down. For instance, switch 130 is provided to manually energize counter 128 which in turn activates feed supply means 132. After delivery of the predetermined number of draughts, the counter automatically opens switch 130 and the feed supply means is shut down.

It is realized that modifications can be made to the control system for the apparatus of this invention. For instance, a high amperage microswitch may be employed in the under and over device to avoid the necessity of employing relay 110 and thus the microswitch may directly transmit its signal to the timer.

In operation, switch 102 is closed thereby actuating the electrical control system and pilot light 106 is lit. Selector switch 118 is set on the automatic position. A predetermined number of draughts is entered into counter 128 and counter 128 is energized by manually closing switch 130 which in turn energizes the feed supply system. The particulate materials, for instance, ice, is discharged from feeding chute 14 and enters hopper 12. Hopper 12 is pulled downward by the weight of the ice accumulating therein, causing weigh beam arms to reflect the movement, and the movement is transmitted to over and under indicator 56. The over and under indicator triggers microswitch 108 when the balance point for the scale is reached, and a signal is sent via line 58 to relay 110 which, by closing contacts 112, energizes timer 114. The timer then sends a signal to counter 128 to register the draught by closing timer contact 116, and concurrently sends a signal to solenoid 122 by closing timer contact 115. Pilot light 126 is now lit indicating that the draught in the hopper is being released.

Solenoid 122 positions the valve in control valve 28 such that the pressurized fluid from line 24 is passed through line 30 to piston and cylinder arrangement 20. The piston is forced by the fluid to the rear of the cylinder and the fluid from the rear of cylinder is released via line 31. The movement of the piston is transmitted through drive arm 22 to pull gate 16 through rollers 18 to its open position. The draught falls by gravity into collector 66 and is transferred to a delivery point via screw feeder 68.

After a predetermined interval, e.g., an interval sufficient to permit the entire draught to be delivered, the timer opens timer contacts 115 and the solenoid is actuated in the opposite direction to direct control valve 28 to transmit fluid pressure to the rear of the piston and cylinder arrangement via line 31, causing the piston to return to its forward rest position and causing gate 16 to close. The apparatus is at the beginning of a successive draught and the cycle will be repeated when the ice collected in the hopper achieves the desired weight.

Any shocks which may be caused by the reciprocating motion of the gate are absorbed by shock absorbing device 62.

On the last draught to be delivered, when timer 114 sends a signal by closing contact 116 to counter 118 for registering, the counter automatically deactivates the feed supply system and opens switch 130, thus ice will not be delivered to the hopper for a successive draught. When the final draught has been delivered, selector switch 118 may be placed in the manual mode, causing gate 16 to be opened and the feeding chute and hopper can be cleaned out. Upon releasing the selector switch from the manual mode, the gate is closed, and power switch 102 may be opened to shut down the system.

It is claimed:

1. An apparatus for weighing successive draughts of particulate material comprising a scale means having a fulcrumed weigh beam counterweighted to balance a predetermined weight of particulate material fed to said scale means, said scale means having a hopper vertically supported from the fulcrumed weigh beam to receive said particulate material, said hopper having an opening in its bottom; a horizontally reciprocating gate adapted to close the bottom of the hopper; a means to horizontally move the gate to open or close the bottom of the hopper; and a horizontally-acting dampening means affixed to a fixed member and hopper having an effective action in a horizontal direction parallel to the direction of reciprocation of the gate to provide dampening of horizontal movement of the hopper caused by the reciprocation of the gate.

2. The apparatus of claim 1 having a timing means in communication with the means to horizontally open the gate whereby the timing means maintains the gate in the open position for a predetermined interval of time after activation of said means to horizontally move the gate and provide a signal to said means to horizontally move the gate to a closed position.

3. The apparatus of claim 1 having a sensing means responsive to the balancing movement of the weigh beam which provides a signal when the predetermined weight of particulate material has been fed to the scale to said means to horizontally move the gate to activate said means to horizontally move the gate to the open position.

4. An apparatus for weighing successive draughts of particulate material comprising a scale means having a fulcrumed weigh beam counterweighted to balance a predetermined weight of particulate material fed to said scale means, said scale means having a hopper vertically supported from the fulcrumed weigh beam to receive said particulate material, said hopper having an opening in its bottom; a horizontally reciprocating gate adapted to close the bottom of the hopper; a means to horizontally move the gate to open or close the bottom of the hopper; a sensing means responsive to the balancing movement of the weigh beam which provides a signal when the predetermined weight of particulate material has been fed to the scale to said means to horizontally move the gate to activate said means to horizontally move the gate to open position; a timing means in communication with the means to horizontally open the gate whereby the timing means maintains the gate in open position for a predetermined interval of time after activation of said means to horizontally move the gate and provide a signal to said means to horizontally move the gate to a closed position; a feed supply means adapted to deliver a continuous stream of particulate material at all times directly to the hopper of said scale means whereby said stream of particles is collected in said hopper at a uniform rate; and a horizontally-acting dampening means affixed to a fixed member and the hopper of said scale means having an effective action in a horizontal direction parallel to the direction of reciprocation of the gate to provide dampening of horizontal movement of said hopper caused by the reciprocation of the gate.

* * * * *